US012800600B2

(12) United States Patent
Boqaileh et al.

(10) Patent No.: US 12,800,600 B2
(45) Date of Patent: Nov. 17, 2026

(54) METHOD AND SYSTEM FOR AN AUTOMATED ARTIFICIAL INTELLIGENCE (AI) TESTING MACHINE

(71) Applicant: LABSCUBED INC., Kitchener (CA)

(72) Inventors: Khaled Boqaileh, Waterloo (CA); Jeffrey Petracca, Brantford (CA); Ammar Jafar, Hamilton (CA)

(73) Assignee: LABSCUBED INC., Kitchener (CA)

( * ) Notice: Subject to any disclaimer, the term of this patent is extended or adjusted under 35 U.S.C. 154(b) by 685 days.

(21) Appl. No.: 17/263,620

(22) PCT Filed: Jul. 25, 2019

(86) PCT No.: PCT/CA2019/051034
§ 371 (c)(1),
(2) Date: Jan. 27, 2021

(87) PCT Pub. No.: WO2020/019084
PCT Pub. Date: Jan. 30, 2020

(65) Prior Publication Data
US 2021/0293836 A1 Sep. 23, 2021

Related U.S. Application Data

(60) Provisional application No. 62/703,985, filed on Jul. 27, 2018.

(51) Int. Cl.
*G01N 35/00* (2006.01)
*G01N 3/08* (2006.01)
*G05B 13/02* (2006.01)

(52) U.S. Cl.
CPC ........... *G01N 35/0099* (2013.01); *G01N 3/08* (2013.01); *G01N 35/00732* (2013.01); (Continued)

(58) Field of Classification Search
CPC ................. G01N 3/08; G01N 35/0099; G01N 2203/0016; G01N 2203/0017
See application file for complete search history.

(56) References Cited

U.S. PATENT DOCUMENTS 4,691,576 A * 9/1987 Schleuniger ............. G01N 3/08 73/821
5,224,386 A * 7/1993 Curtis ...................... G01N 3/04 73/833
(Continued)

FOREIGN PATENT DOCUMENTS

CN 107132334 A 9/2017
DE 3542375 A1 6/1987
(Continued)

OTHER PUBLICATIONS

Cui et al., Rock Physical Mechanics Parameter of Intelligent Integrated Test System and Test Method Thereof, Sep. 2017, FIT Computer Translation (Year: 2017).*
(Continued)

*Primary Examiner* — Erika J. Villaluna
(74) *Attorney, Agent, or Firm* — Gowling WLG (Canada) LLP

(57) ABSTRACT

The disclosure is directed at testing machine for material samples. The testing machine includes a loading station and a testing station along with a pick and place apparatus that moves the material sample being tested between the loading station and the testing station. A control system controls movement of the material sample. The control system also generates testing machine parameters along with testing parameters.

18 Claims, 10 Drawing Sheets

(52) U.S. Cl.
CPC . *G05B 13/0265* (2013.01); *G01N 2203/0206* (2013.01); *G01N 2203/0208* (2013.01)

(56) References Cited

U.S. PATENT DOCUMENTS

| | | | | |
|---|---|---|---|---|
| 5,619,135 | A * | 4/1997 | Kohn | G01N 33/204 73/779 |
| 2012/0111118 | A1 | 5/2012 | Keeton et al. | |
| 2016/0334315 | A1 | 11/2016 | Leroux et al. | |
| 2020/0166443 | A1* | 5/2020 | McCarty, II | G01N 21/88 |

FOREIGN PATENT DOCUMENTS

| | | | |
|---|---|---|---|
| JP | H07 34351 | U | 6/1995 |
| JP | H08 304249 | A | 11/1996 |
| JP | 2001-281121 | A | 10/2001 |
| JP | 2004 361123 | A | 12/2004 |
| JP | 2005 172517 | A | 6/2005 |
| JP | 09-089737 | A | 4/2009 |
| JP | 08-313424 | A | 6/2010 |

OTHER PUBLICATIONS

Supplementary European Search Report for Application EP 19 83 9916 dated Mar. 17, 2022.
Notice of Reasons for Rejection, and its English translation thereof for Application No. JP 2021-527260 dated May 2, 2023.
Notice of Reasons for Rejection, and its English translation thereof for Application No. JP 2021-527260 dated Jan. 19, 2024.
Notification of First Office Action for the corresponding Chinese Application No. 201980064283.7 dated Nov. 2, 2023.

* cited by examiner

940

940

METHOD AND SYSTEM FOR AN AUTOMATED ARTIFICIAL INTELLIGENCE (AI) TESTING MACHINE

CROSS-REFERENCE TO RELATED APPLICATION

The present disclosure claims priority to U.S. Provisional Application No. 62/703,985 filed Jul. 27, 2018, which is hereby incorporated by reference.

FIELD OF THE DISCLOSURE

The disclosure relates generally to manufacturing and testing machines, and more specifically, to a method and system for an automated artificial intelligence testing machine.

BACKGROUND

Conventional materials' testing is typically performed by a user loading a material sample into a testing apparatus by hand and then testing the material sample. Examples of materials tests include tensile testing, compressive testing, dynamic mechanical testing, hardness testing, and abrasion testing. The parameters used during each test may affect the test results. Depending on the nature of the test, the material sample may be secured within the testing apparatus by applying pressure to the sample such that the pressure applied is seen as a testing parameter. Variation in the pressure applied to the sample may cause variation in the measured results of the materials test, introducing error into the test. There is a need in the art for devices and methods for materials testing with reduced error due to reduced variation in testing parameters.

Therefore, there is provided a novel method and system for an automated artificial intelligence testing machine.

SUMMARY OF THE DISCLOSURE

In one aspect of the disclosure, there is provided an automated artificial intelligence (AI) driven testing machine for testing at least one material sample including a loading station for receiving the at least one material sample; a testing station to test a testing property of the at least one material sample; a pick-and-place (PP) apparatus to transfer the at least one material sample between the loading station and the testing station; and a control system to control the testing station and the and the PP apparatus and to collect data associated with the testing station.

In another aspect, the system further includes at least one measurement station for measuring a measurement property of the at least one material sample. In another aspect, the loading station includes a loading tray or a magazine loading system. In a further aspect, the testing station includes a pair of AI grips.

In yet another aspect, the pair of AI grips includes a stationary AI grip; and a mobile AI grip. In a further aspect, the mobile AI grip moves with respect to the stationary AI grip to test the at least one material sample. In yet a further aspect, a strain and stress of the at least one material sample is tested. In an aspect, each of the pair of AI grips includes an actuator for enabling the AI grip to grip the at least one material sample. In another aspect, the actuator is a stepper motor.

In an aspect, the pair of AI grips further includes a set of sensors. In another aspect, the set of sensors sense slip. In yet a further aspect, the control system processes the measurement property to generate parameters for the testing station. In yet another aspect, the parameters are associated with AI grip characteristics. In yet another aspect, the AI grip characteristics include grip strength.

In another aspect of the disclosure, there is provided a method of automated testing of at least one material sample including receiving the at least one material sample; determining testing parameters for the at least one material sample; and testing the at least one material sample with the determined testing parameters.

In yet another aspect, determining testing parameters includes determining at least one measurement property of the at least one material sample; and processing the at least one measurement property to determine the testing parameters. In another aspect, the testing parameters include grip strength or grip force. In yet a further aspect, testing the at least one material sample includes performing a tensile test on the at least one material sample. In a further aspect, the method includes measuring a stress force applied to the at least one material sample. In another aspect, the method includes measuring a strain force applied to the at least one material sample.

BRIEF DESCRIPTION OF THE DRAWINGS

Embodiments of the present disclosure will now be described, by way of example only, with reference to the attached Figures.

DETAILED DESCRIPTION OF THE DISCLOSURE

The present disclosure is directed at a system and method of automated materials testing that uses artificial intelligence (AI) to determine improved sample loading and/or testing parameters and automatically perform materials tests with reduced error.

Figure 1:
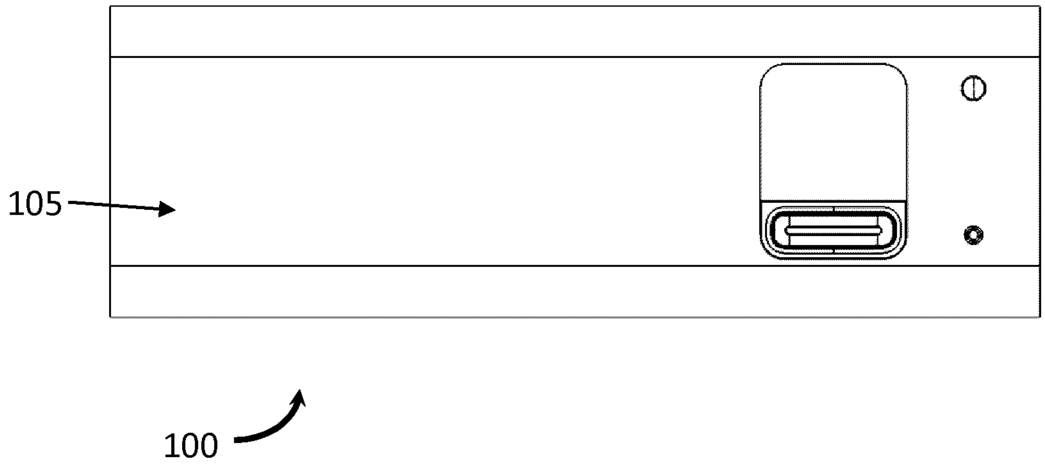
FIG. 1 is a front view of an automated artificial intelligence (AI) driven testing machine.
Figure 2:
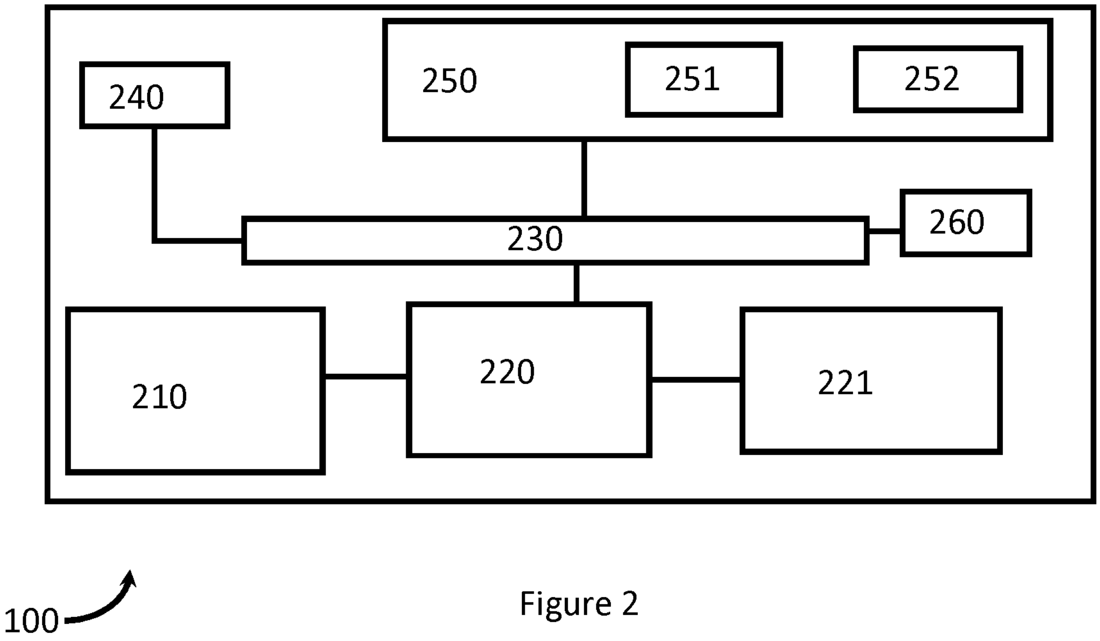
FIG. 2 is a schematic diagram of an embodiment of an automated AI driven testing machine.

FIG. 1 is a front view of an automated artificial intelligence (AI) driven testing machine 100 with a housing 105. FIG. 2 is a schematic diagram of an embodiment of the automated AI driven testing machine 100. In one embodiment, the machine 100 includes a loading, or tray loading section 210 for receiving a sample tray, a first measurement station 220, a second measurement station 221, a pick-and-place (PP) station 230, a testing station 240, a controller 250, and a marking system 260. The controller 250 includes a processor 251 and memory 252 which may include processor-readable non-transitory data storage. In the drawing, certain connections between components are shown, however, it will be understood that not all connections are shown but will be understood.

Material samples that are to be tested by the testing machine 100 may be loaded into the loading section, such as via a sample tray. In other words, the testing machine 100 may receive material samples by loading the material samples into a sample tray and loading the sample tray into the tray loading section 210. In one embodiment, the sample tray 210 is filled manually and then inserted into the loading section. In another embodiment, the sample tray may be a permanent component within the housing 105 and samples may be individually inserted into the sample tray. This insertion may be performed manually or in an automated manner. The PP system 230 is used to transfer the material sample within the testing machine 100. For instance, the PP system may transfer a material sample between different stations within the machine 100 such as between the sample tray or loading station 210, the first measurement station 220, the second measurement station 221, the marking station 260 and the testing station 240 in an automated manner. In one embodiment, the processor 251 accesses a program stored in memory 252 to control the movement of PP system 230 or may control the movement of the sample based on input from a user. The first measurement station 220 may measure a first measurement property of the sample, for example a hardness, a surface roughness, and/or a density of the sample. The hardness may be determined by, for example, a Rockwell hardness test, a Vickers hardness test, a Knoop hardness test, and/or a Brinell hardness test. The second measurement station 221 may measure a second property of the sample, for example a thickness and a width of the sample. The thickness and width of the sample may be determined with, for example, a dial gauge, a dial thickness gauge, a high resolution camera, a line-scan system, laser rangefinders, and/or edge detection. In a preferred embodiment, the second measurement station may be calibrated with a known thickness and width of a standard sample. The measurements taken by the measurements stations 220 and 221 may be stored in memory 252. It will be understood that the system may include other measurement stations for determining a measurement property of the material sample.

The measurements, seen as data, may be used to modify test parameters for the testing station 240 and for post-test analysis. While in a preferred embodiment, each of measurement stations 220 and 221 are integrated parts or components of the machine 100, the stations 220 and 221 may be peripheral components added to and/or removed from machine 100 as required.

The marking system 260 may apply visible marks to the material sample in an automated manner. For example, the marking system 260 may apply two marks to the material sample for testing, analysis or information gathering purposes. The marking system 260 may include a marker, an inkjet printer, a laser, or any other method of marking the sample. While not shown, the testing station 240 preferably includes a set of AI grips, as will be discussed in more detail below.

The processor 251 may load data from the memory 252 to compare the parameters of the sample and the testing station 240 to parameters from previous samples and tests. The processor may also send commands to the controller 250 to modify the properties of the AI grips.

The testing station 240 may test the material sample in an automated manner, for example by performing a test on the sample with AI grips. Non-exclusive examples of tests which may be performed include, but are not limited to, tensile, tear, fatigue, compression, flexion, and bending tests.

For tensile testing, the sample is typically gripped at opposite ends of the sample by the AI grips, where the grip force and the gripping position are determined by the processor such as via input from the user or via data from the measurement stations. A pulling force is then applied to the sample via the AI grips, with the force necessary to pull the sample (i.e. stress) and the stretching of the sample due to the pulling force (i.e. strain) measured, typically until the sample breaks. The stress-strain relationship provides information on the properties of the material sample, and may include the sample's strength, toughness, modulus, onset of plastic deformation, etc., The gripping force may be determined by the user or may be retrieved from memory and may vary from one material to another. A gripping force that is too low may cause the sample to slip during the tensile test, causing a sudden change in the measured stress and the measured strain, and therefore error in the measurement. A gripping force that is too high may damage the sample, causing the sample to break prematurely and also causing error in the measurement. In the current disclosure, the gripping strength may be determined via the measurements to reduce the likelihood of error during the test. Although the systems, devices and methods of the present disclosure discuss tensile testing for the sake of clarity, a person having ordinary skill in the art with the benefit of the present disclosure will appreciate that the present disclosure may apply to a wide variety of materials tests, for example to compression testing, dynamic mechanical testing, abrasion testing, and the like.

In one embodiment, the testing station 240 may perform a tensile test on the sample by pulling the sample at a strain rate of 8.33 mm/s. In one embodiment, the testing station 240 may perform a tensile test on the sample by pulling the sample at a strain rate of up to 100 mm/s. The testing station 240 may also perform a tensile test on the sample by pulling the sample with a pull force of up to 1,000 Newtons, or up to 10,000 Newtons. The pull force may be dynamically adjusted during testing to maintain a constant strain rate. The testing station 240 may halt testing when sample breakage occurs, for example by detecting when the pull force necessary to maintain a constant strain rate drops to at least approximately zero.

In one embodiment, the testing station 240 includes a computer vision system such as a high resolution camera. The computer vision system is positioned and oriented to generate a video of the sample as the sample is tested, and is communicatively coupled to the controller 250. The video may be stored in the memory 252 and analyzed by a computer vision program run to monitor the position of marks made by the marking system. The position of the marks, as determined by the computer vision system, may be used by the processor to determine the distance between the marks and thereby the strain of the sample as the sample is pulled by the testing station. The position of the marks and/or the distance between marks may be calibrated with a calibration sample. In addition to determining the position of the marks, the computer vision system may determine the sample loading position and compare the sample loading position with a preferred sample loading position. The sample loading position may be determined by the computer vision system by overlaying an image of the sample obtained by the computer vision system over a reference image stored in memory 252 to determine any difference between the actual position of the sample and the preferred position of the sample in the reference image. The position of the sample may be determined by the computer vision system by comparing the position of the sample to the position of a physical reference visible to the computer vision system. The preferred sample loading position may be a sample loading position correlated with successful test performance by an AI algorithm. The computer vision may determine the elongation of the sample with error equal to or less than 1%. The computer vision system may include two synchronized cameras to determine the strain of the sample as the sample is tested.

The computer vision system may also determine the shape of the sample and compare the sample shape with known sample shapes to automatically choose a test with a matching sample shape. The computer vision system may also determine the strain of the sample by directly analyzing the change in shape of the sample as determined by computer vision, i.e. without using the marks.

For gripping the sample immediately prior to testing, the AI grips may adjust the grip strength and distance based on feedback from previous tests. The feedback may include measured parameters such as hardness, thickness, width, density, and surface roughness of the sample, and/or data from similar samples that have already been tested in the past. Using this past data, and sample data for each sample, and AI analysis thereof, a preferred grip strength may be determined and used during the testing in testing station 240 to carry out the testing in a repeatable fashion. In this regard the AI grips may learn from each test performed and may increase the accuracy of the optimal or preferred grip strength determination after each test.

Figure 3:
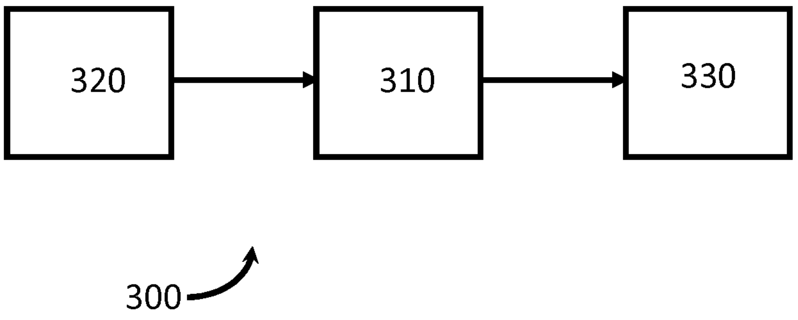
FIG. 3 is a schematic diagram of a system for determining testing parameters using AI.

FIG. 3 shows a schematic diagram of a system 300 for determining testing parameters using AI. The system 300 includes an input component that provides inputs 320 into a processor 310 that processes the inputs 320. The processor 310, which may be the same as processor 251, preferably includes an algorithm 310 that processes the inputs 320 to determine testing parameter values 330 for improving the grip strength or parameters of the AI grips. Non-exclusive examples of inputs 320 include material sample composition, hardness, thickness, width, and density. Non-exclusive examples of testing parameter values 330 are grip force, grip closing distance, and dynamic closing ratio. The dynamic closing ratio is the ratio of sample strain to sample thickness at that strain, in other words the amount by which the grip closing distance of the AI grips may be reduced to compensate for the thinning of the sample that occurs as the sample is stretched. Improving the gripping ability of the AI grips may include improving the ability of the grips to grip a variety of materials. Improving the gripping ability of the grips may include gripping the samples with testing parameters correlated with successful tests. Additionally, in some embodiments, the PP system may include a moveable gripper, and the grip strength of the moveable gripper may be the same as the grip strength of the AI grips.

Figure 4:
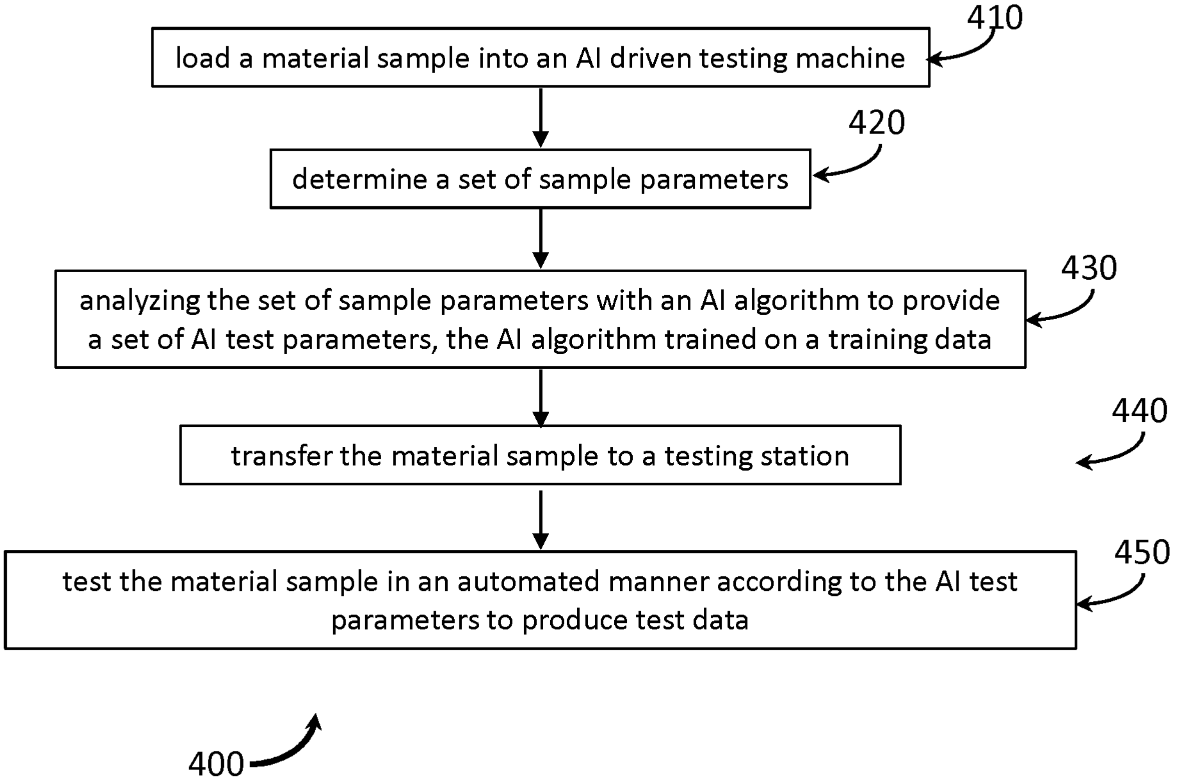
FIG. 4 is a flowchart outlining a method for automated AI testing of materials.

FIG. 4 shows a flow-diagram for a method 400 for automated AI testing of materials. Initially, a material sample is loaded into or received by an AI driven testing machine (410). Loading a material sample into an AI driven testing machine may include loading a material sample into a single sample holder and loading the sample holder into the AI driven testing machine. Another example of loading a material sample into the machine may include loading a plurality of material samples into a plurality of slots in a loading tray.

A set of material sample parameters are then determined or measured (420). The sample parameters may be determined by measuring properties of the material sample at at least one measuring station to produce measurement data. The material sample parameters may also be determined by accessing data associated with the material sample in a database and/or in memory. The measurement data may include physical dimensions (length, thickness, shape), composition (chemical composition, crosslink density, filler size and volume fraction, processing history), viscoelastic properties, hardness, toughness, strength, and modulus.

The material sample parameters are then analyzed to provide a set of AI test parameters (430). In one embodiment, the set of material sample parameters may be analyzed by a processor with an AI algorithm trained on a training data stored in memory. The training data may include test parameters such as, but not limited to, grip strength and grip position. Prior to testing, the AI algorithm may be trained on training data that may include analyzing the test parameters for successful (e.g. no slippage occurs) and unsuccessful (e.g. slippage occurs) tests to correlate a set of AI test parameters with successful tests.

Analyzing the set of sample parameters with an AI algorithm to provide a set of AI test parameters may also include analyzing a plurality of sets of sample parameters with an AI algorithm to provide a plurality of sets of AI test parameters for example by analyzing each set of sample parameters in sequence.

In one embodiment, the AI test parameters may include a stationary AI grip position, a mobile AI grip position and an AI grip strength. The stationary grip position may be determined by moving the sample relative to the stationary AI grip with a PP system. The mobile grip position may be determined by moving the sample relative to the mobile AI grip with a PP system or by moving the mobile AI grip relative to the sample. The grip strength may be above a threshold for sample slippage or below a threshold for sample damage or both.

The material sample is then transferred to a testing station (440) such as via a PP system. The material sample is then tested according to the AI test parameters to produce test data (450). For instance, the tensile strength of the material sample may be tested. In this example, the processor transmits the AI test parameters (such as grip position and strength) to the AI grips to grasp the sample with the determined AI test parameters. The sample can then be tested (as discussed above with respect to stress and strain) by having the two AI grips pull the sample apart. The AI grip strength may be monitored with a pressure sensor. In another embodiment, testing the material sample in an automated manner according to the AI test parameters may include pulling the material sample by moving the mobile grip away from the stationary grip, measuring a strain of the material sample as the material sample is pulled to produce a strain data, and measuring a stress of the material sample as the material sample is pulled to produce a stress data.

Testing the material sample in an automated manner according to the AI test parameters may include marking the material sample with at least two strain gauge marks. Measuring a strain of the material sample may include recording a video of the material sample as the material sample is pulled, and analyzing the video with a computer vision algorithm. Recording the strain data includes recording the video, for example in memory (252). Recording the video may allow playback of the video at a later time, for example after a failed test to allow identification of the reason for test failure. Pulling the material sample may include monitoring the material sample for slippage, and if slippage occurs flagging the test data with a slip flag. Slippage may be monitored with a slip sensor, or by changes in the stress and/or strain rate. Tests flagged with a slip flag may be reviewed to identify root causes for slippage, for example by reviewing the video of the test as described above.

After the testing is completed, the torn material sample may be unloaded by the grip, such as into the sample holder or tray. Unloading the material sample from the AI driven testing machine may include transferring the at least two sample pieces to a second part of the sample holder in an automated manner and unloading the sample holder from the AI driven testing machine. The loading, determining, analyzing, transferring, testing, and unloading may be repeated for the next sample if multiple samples are to be tested.

In another embodiment, the continued material testing may enable a combining of the set of AI test parameters, the set of sample parameters, and the test data with the training data to produce an updated training data, and training the AI algorithm on the updated training data such as to improve the accuracy of the AI algorithm.

Figure 5:
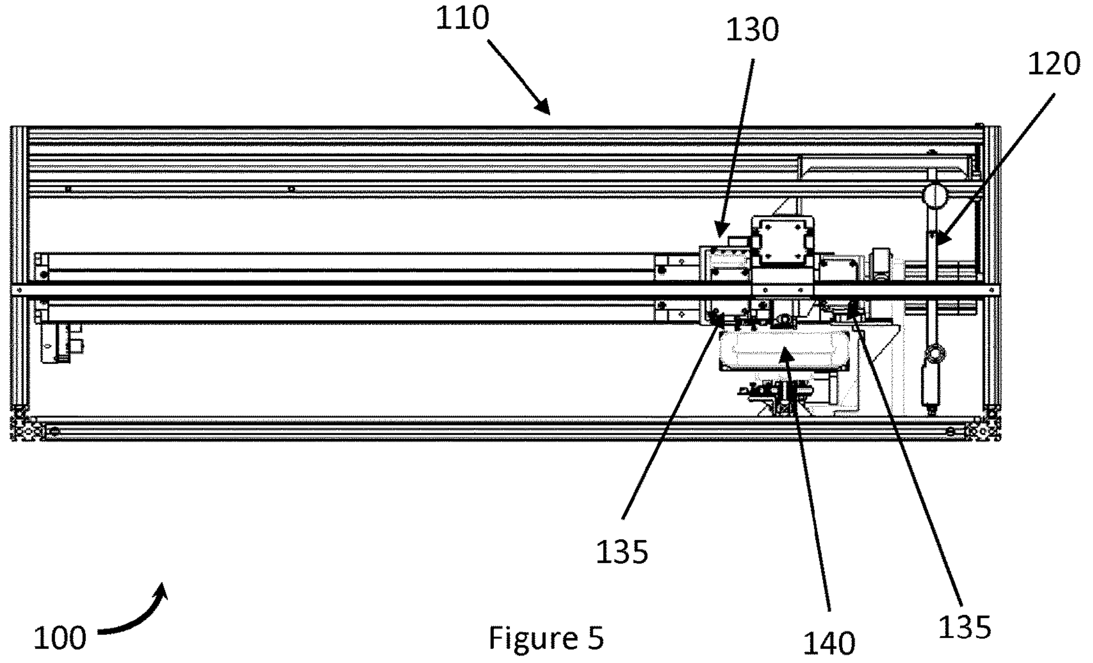
FIG. 5 is a front view of the AI driven testing machine without a housing.
Figure 6:
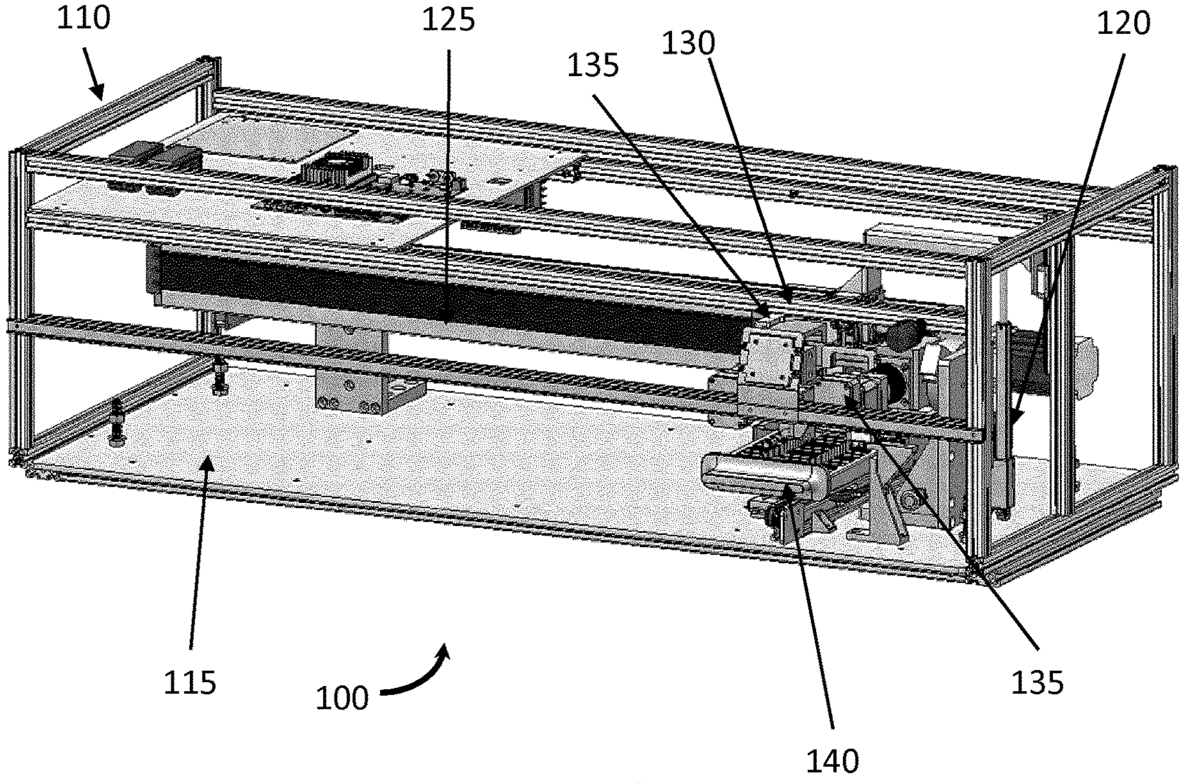
FIG. 6 is a perspective view of the AI driven testing machine without a housing.
Figure 7:
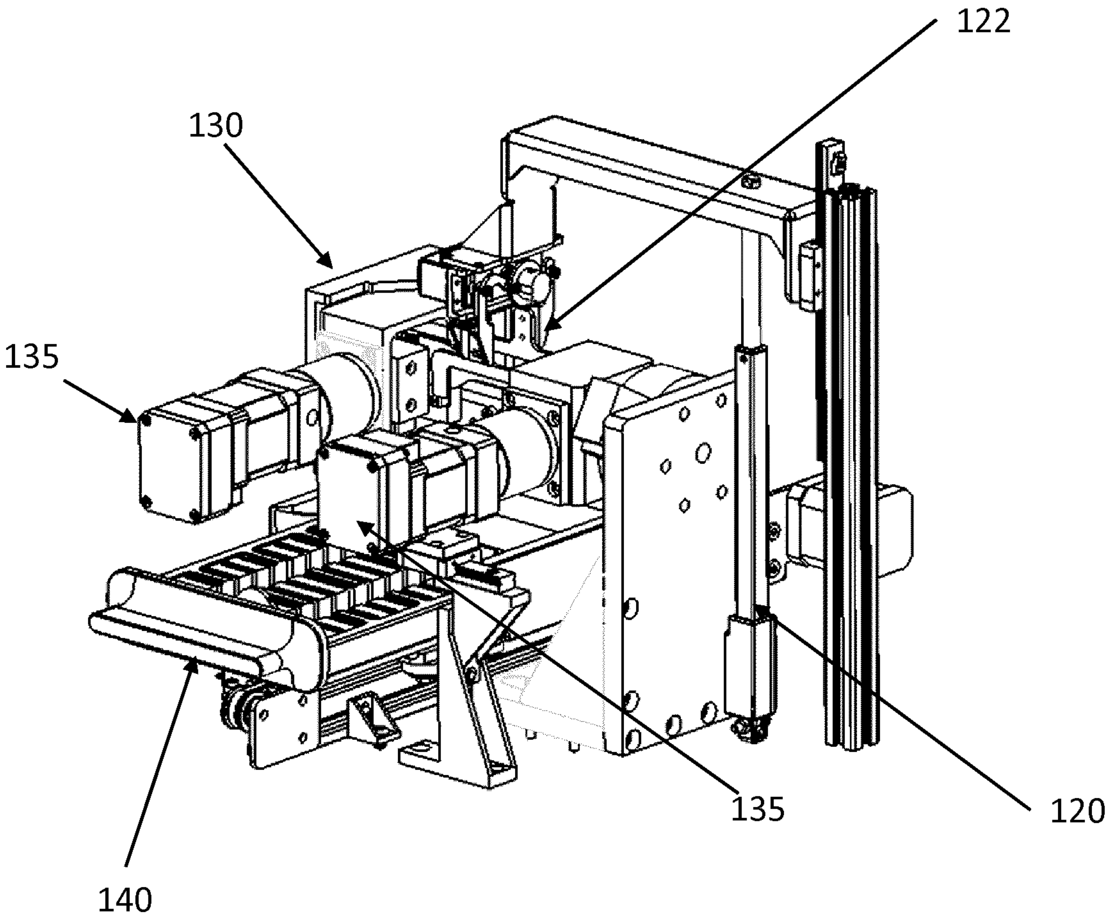
FIG. 7 is a perspective view of a segment of the AI driven testing machine.

FIG. 5 shows a more detailed front view of the testing machine 100 without a housing. FIG. 6 shows a perspective view of testing machine of FIG. 5 and FIG. 7 shows a perspective view of a segment of the testing machine.

The testing machine 100 includes a frame 110, a base 115, a pick-and-place (PP) system 120, a rail 125, a pulling, or testing, system 130 including two AI grips 135, and a loading system 140. The first AI grip is moveably coupled to the rail 125 by a linear movement system and may be seen as a mobile grip, and the second AI grip 130 is immovably coupled to the base 115 and may be referred to as a stationary grip. The loading system 140 is coupled to the base 115. The linear movement system may be a ball screw linear actuator driven by a servo motor or a pulley and belt system driven by a servo motor, DC motor or AC motor.

The housing 105 encloses all the components inside the testing machine 100 and has multiple locations for access and maintenance. The loading system 140 includes all the components that are required for inserting or receiving samples into the testing machine 100. The PP system 120 transports samples through the machine, for example from the loading system 140 to the AI grips 135. The testing system 130 includes the AI grips 135, load cells, sensors and linear movement system to ensure that tests are completed by the machine.

Figure 8:
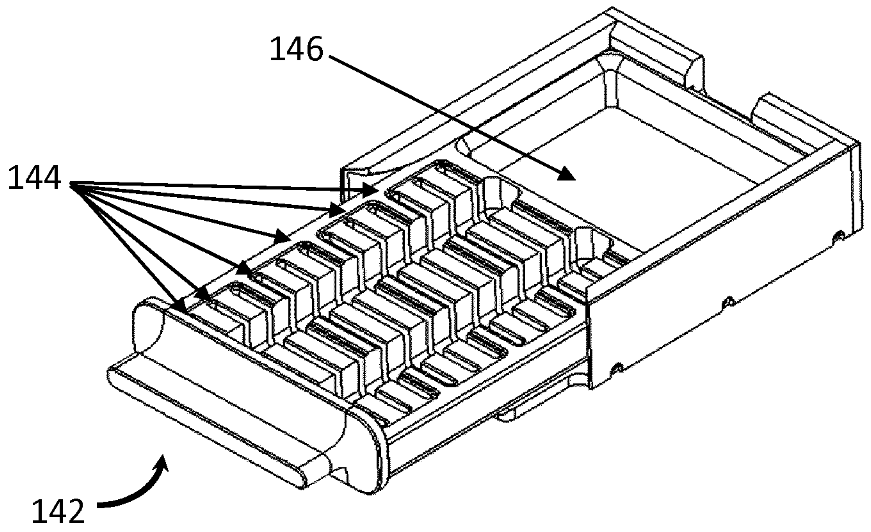
FIG. 8 is a perspective view of a tray for loading samples.

The samples are loaded into the testing machine 100 in an organized manner through an opening in the housing 105. The embodiment shown in FIGS. 1 and 5-7 uses a tray 142, as shown in FIG. 8, but other embodiments may use other loading systems such as a magazine loading system or a system in which samples are placed on top of each other and placed into the machine. Tray 142 includes twelve slots 144, where each slot may hold a sample. In alternative embodiments tray 142 may contain a different number of slots 144, such as six, twelve, or any number of slots 144. Tray 142 includes compartment 146 to hold the broken pieces of tested samples.

The loading system 140 may position samples in a location to be picked up by the PP system 120 in an organized manner. For example, each sample held in each slot 144 may be picked up by the PP system 120 in sequence. The sequence may be in any order desired. Advantageously, the identity of each sample held in each slot 144 may be correlated with the data resulting from testing of each sample by the testing machine 100. Tray 142 may move horizontally in a linear fashion to align each slot 144 with the PP system 120.

The tray 142 may include at least one sensor to provide sample loading information. Non-exclusive examples of sample loading information include: alignment information (for example, whether the tray 142 is properly loaded into testing machine 100, calibration information to determine the position of each slot 144 relative to the PP system 120) and sample quantity and location information (for example, which slots 144 contain samples, whether each sample is positioned within each slot to allow for automated sample testing). Testing machine 100 and/or tray 142 may include a sensor to detect whether the tray 142 is inserted into testing machine 100, and the testing machine 100 may be configured to initiate sample testing only when a tray 142 is detected as being inserted into testing machine 100.

Once the samples are loaded into the machine, the PP system 120 may move the samples into a plurality of positions within testing machine 100.

The PP system 120 includes a moveable gripper 122 to grip a material sample held in one of the slots 144. In a preferred embodiment, the PP system 120 is moveable in a vertical direction, and may move a sample gripped by the moveable gripper 122 in that direction. Vertical movement of the sample in an upward direction may position the sample in the AI grips. The sample may be transferred from the moveable gripper 122 to the AI grips so that the AI grips may grip the sample and the moveable gripper may then release the sample. The sample, now gripped solely by the AI grips, may then be tested. After testing, the sample (or the broken pieces of the sample) may be gripped by the moveable gripper 122 such that the AI grips 135 release the sample pieces, and the pieces may be moved vertically in a downward direction to return the sample to tray 142.

Carrying out the test includes pulling the sample by moving the mobile grip (that is movably coupled to the rail) away from the stationary grip. The AI grips may pull the sample by gripping the sample while the linear movement system moves the mobile grip away from the stationary AI grip. Once the system has completed the test, the sample is removed from the AI grips by PP system 120 and the broken pieces of the sample returned to tray 142, and the next sample is tested until all available or required samples have gone through all the testing. If testing the sample includes breaking the sample, returning the sample to the tray 142 may include returning the sample to the compartment 146 of the tray 142.

The PP system 120 may also position the material sample in the AI grips 135 at a plurality of positions, wherein each position includes a different height, lateral position, and/or angle of the sample relative to the AI grips.

With respect to testing, for example, a rubber sample may be gripped with an AI grip strength determined by the AI test parameters of grip strengths used for successful tensile testing of rubber samples, where successful testing is defined as tests where neither slippage nor sample damage due to excessive grip strength occurred. For another example, a Nylon 6,6 sample may be gripped with an AI grip strength determined by test parameters of grip strengths used for successful tensile testing of nylon samples.

Figure 9:
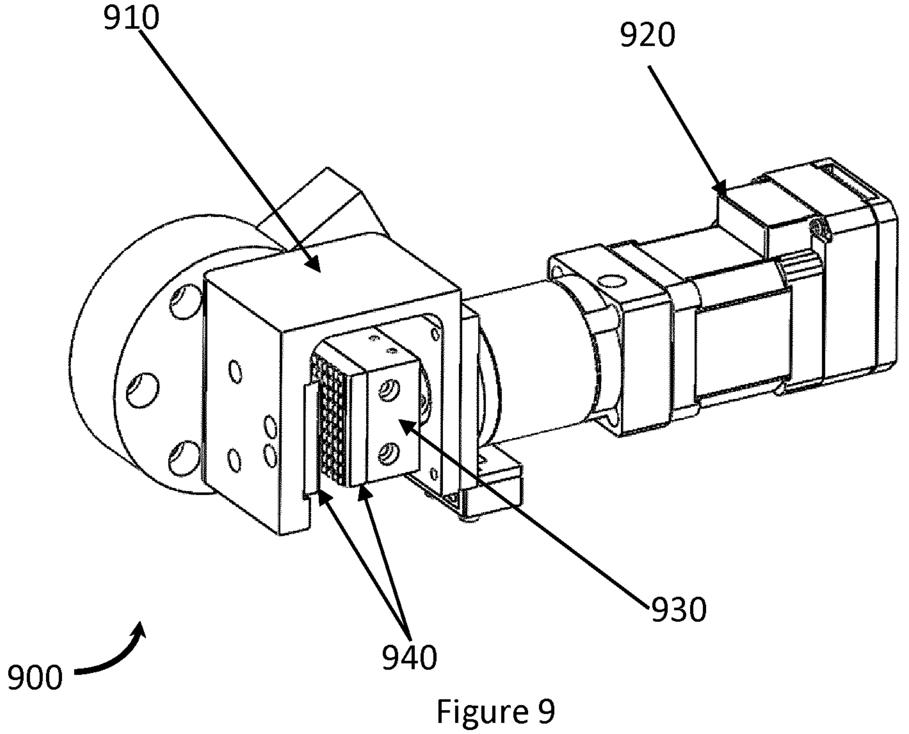
FIG. 9 is a perspective view of an AI grip.

FIG. 9 shows a perspective view of an AI grip. The AI grip 900 may be substantively similar to the AI grip 135. The AI grip 900 includes a grip housing 910, an actuator 920, a coupler 930 and pressure pads 940. In operation, the actuator 920 generates a closing pressure on a sample held between the two pressure pads 940 by exerting a linear force on coupler 930. The linear force on coupler 930 is transmitted through coupler 930 to the second pressure pad 940. The second pressure pad 940 spreads the linear force across the surface of the sample in contact with the second pressure pad 940 to create the closing pressure.

Figure 14:
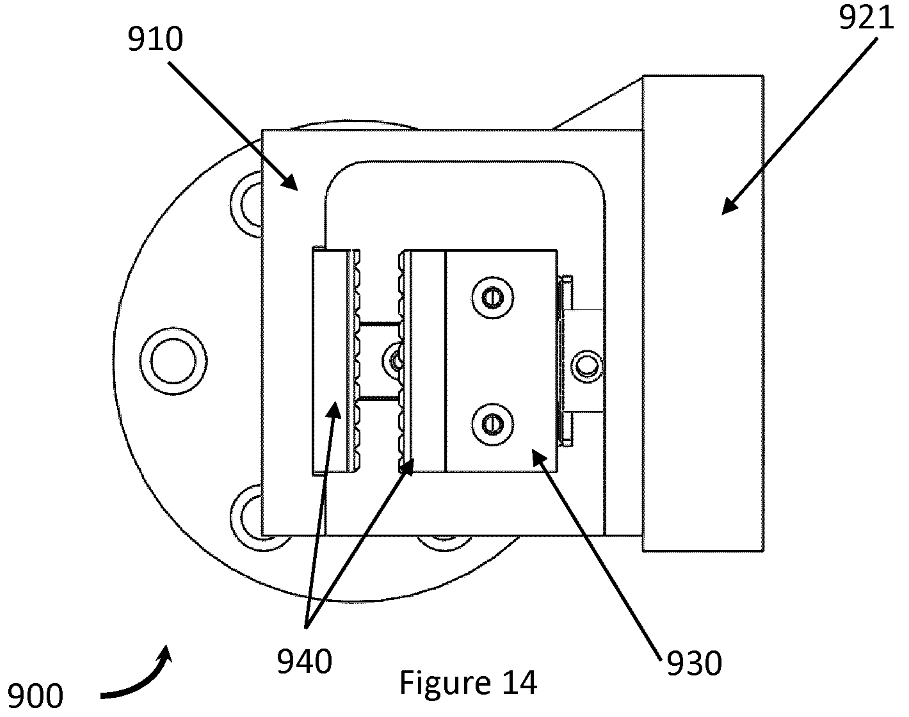
FIG. 14 is a front view of the AI grip with a DC motor.
Figure 16A:
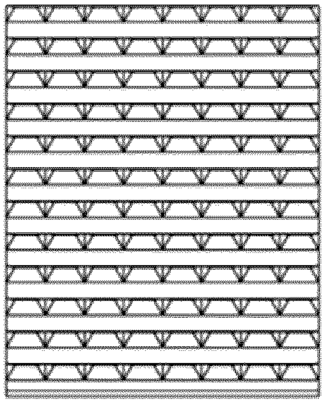
FIG. 16A is a diagram of a pressure pad.
Figure 16B:
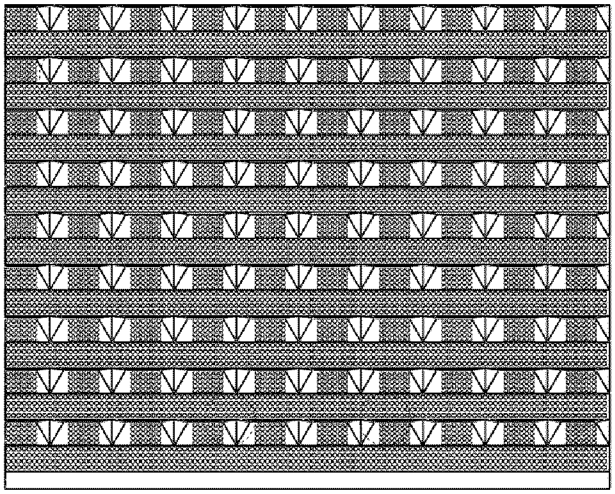
FIG. 16B is a diagram of a pressure pad.

The actuator 920 may be a stepper motor (as shown in FIG. 9), a DC motor (as shown in FIG. 14), a pneumatic actuator, or any type of mechanism that can be used to create a linear pressure. The pressure pads 940 are preferably designed such that the samples do not slip during testing but also that the gripped section of the sample is not damaged during the testing. In one embodiment, the surface of the pressure pads may be made with multiple coatings to improve the grips for all materials during testing. An example of pressure pad design is the fish-scale design, which is shown in FIG. 16A. Another example of pressure pad design is the fish-scale design in combination with sandpaper design, which is shown in FIG. 16B.

Figure 10:
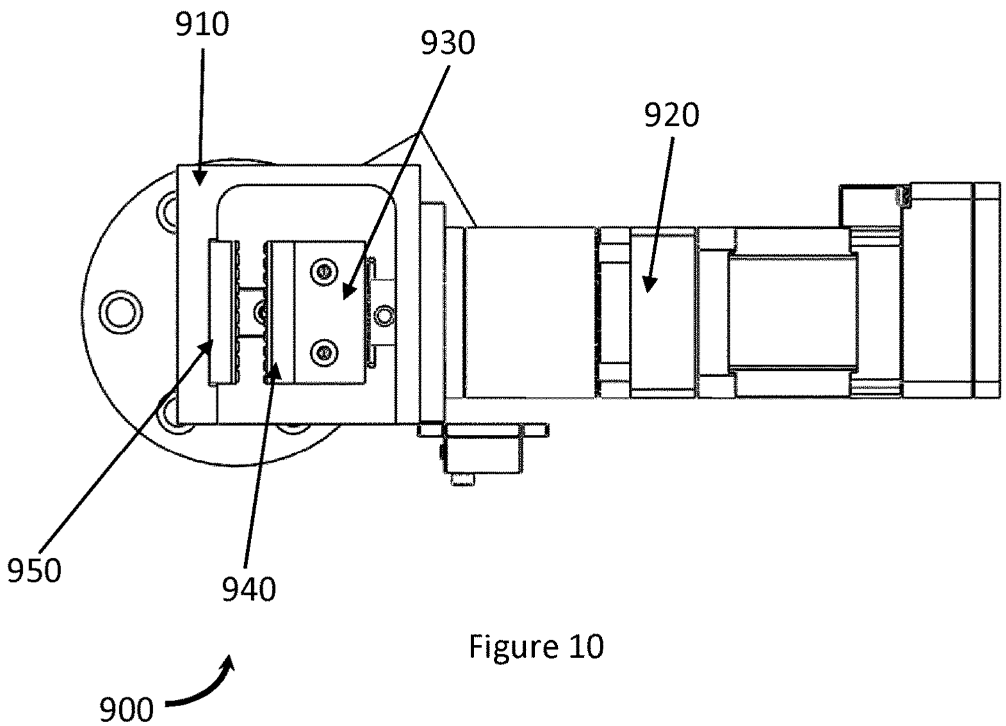
FIG. 10 is a front view of an AI grip with an internal sensor.

FIG. 10 shows a front view of another embodiment of an AI grip 900. Along with the grip housing 910, the actuator 920, the coupler 930 and the set of pressure pads 940, the grip 900 further includes a, preferably internal, pressure sensor 950 for measuring pressure. In the current embodiment, the pressure sensor 950 is coupled to the housing 910. As discussed above, the actuator 920 generates a closing pressure via coupler 930 on a sample held between the pressure pad 940 and the pressure sensor 950 measures the intensity or force of the closing pressure created by actuator 920.

Figure 11:
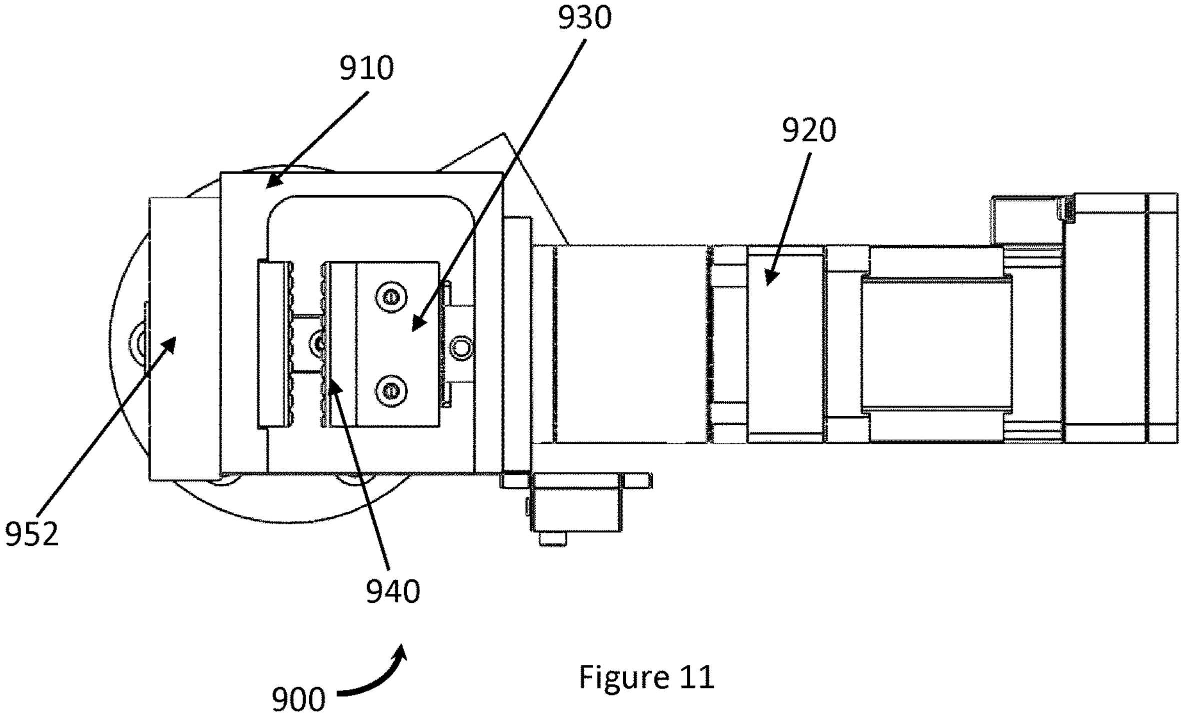
FIG. 11 is a front view of an AI grip with an internal pressure sensor in an alternative geometry.

The sensor 950 may be a miniature load cell, brake load cell, force sensing resistor (FSR), quantum tunneling composite (QTC) or any other sensor that measures pressure/force. The pressure sensor 950 may provide feedback to the processor to ensure that the sample is gripped with a pressure that reduces the likelihood that slippage occurs. FIG. 11 shows a front view of embodiment of AI grip 900 with a pressure sensor in an alternative geometry, where the sensor 952 is located external to housing 910. In this embodiment, the pressure sensor may measure the pressure transmitted from actuator 920 through pressure pad 940, the sample, and housing 910.

Figure 12:
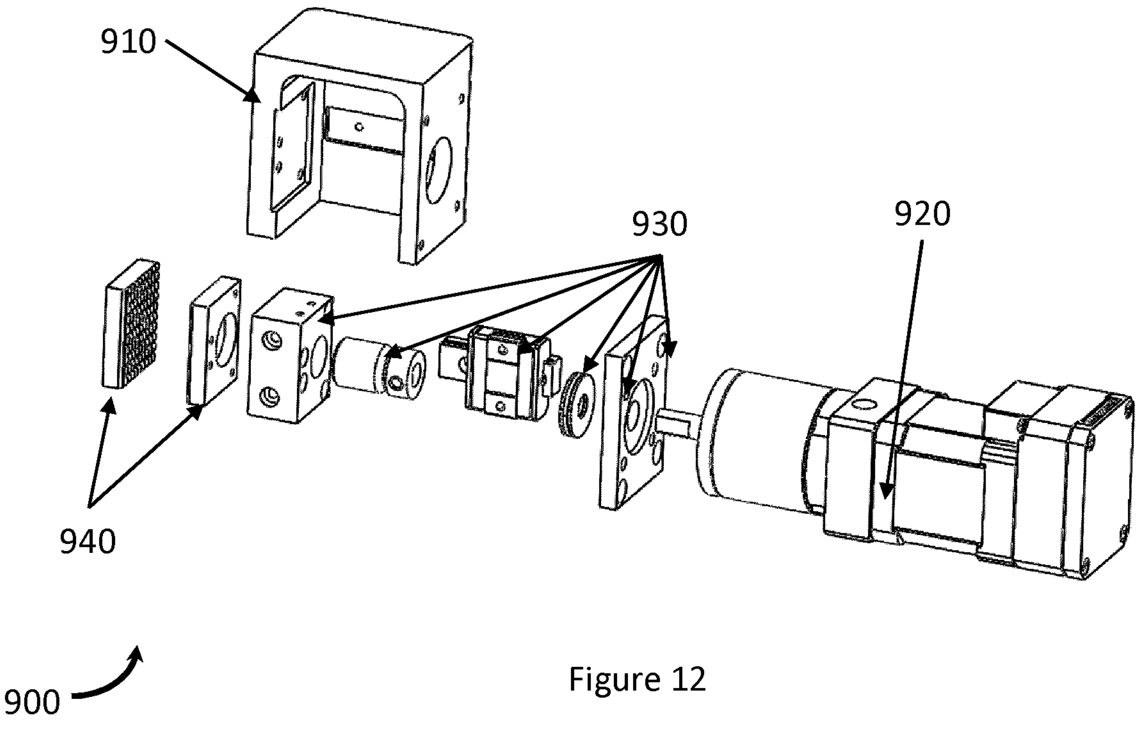
FIG. 12 is an exploded view of the AI grip.
Figure 13:
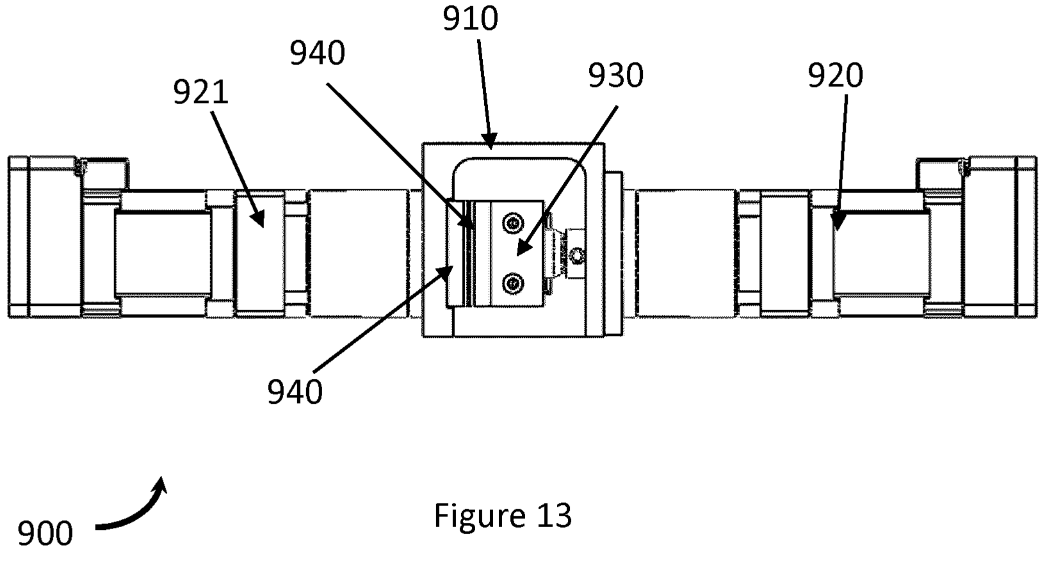
FIG. 13 is a front view of an embodiment of the AI grip with two actuators.

FIG. 12 is an exploded view of the AI grip 900. FIG. 13 shows a front view of an embodiment of AI grip 900 with two actuators. The first actuator 920 and a second actuator 921 generate the closing pressure from each side of the AI grip 900. The AI grip 900 includes a housing 910 coupled to the first actuator 920 and the second actuator 921. The coupler 930 is coupled to the first actuator 920. A first pressure pad 940 is coupled to the coupler 930. A second pressure pad 941 is coupled to the second actuator 921.

FIG. 14 shows a front view of another embodiment of the AI grip 900. In the present embodiment, the actuator 921 is a DC motor.

Figure 15:
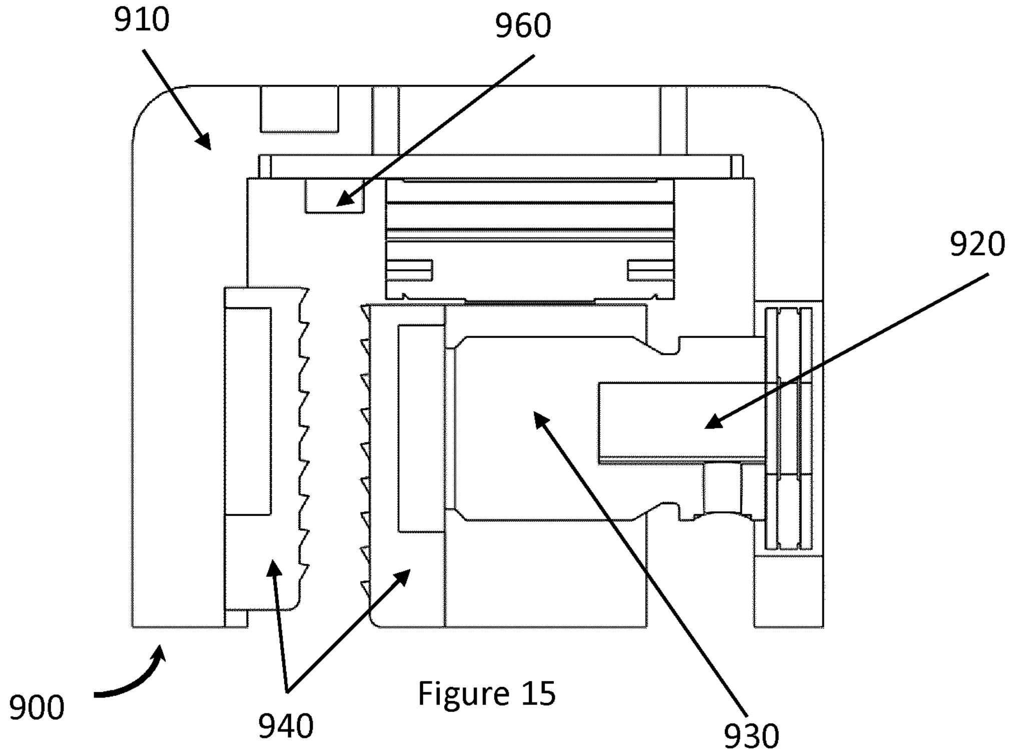
FIG. 15 is a top view of an embodiment of the AI grip with a slip sensor.

FIG. 15 shows a top cross-sectional view of an embodiment of another embodiment of an AI grip 900. In this embodiment, the grip 900 includes a slip sensor 960 to detect slippage. The grip housing 910 is coupled to the slip sensor 960 that detects if the sample slips during testing. The slip sensor 960 may be a laser measurement system, an electromechanical switch in physical contact with the sample, or any other sensor that detects movement. The slip sensor 960 may provide feedback so that the test may be flagged if slip occurs during the test. The AI grip 900 may also dynamically move and/or increase the grip pressure to arrest the slip and ensure that the results for that sample are not lost. Additionally, the AI grip 900 may include both the slip sensor 960 and the pressure sensor 950. During testing the grips may detect slip through the pressure sensor and/or the slip sensor and may automatically adjust the grip pressure to stop the slip. If stopping the slip is not possible, the machine may flag the test and/or analyse the results to see if the slip had an effect on the results.

Figure 17:
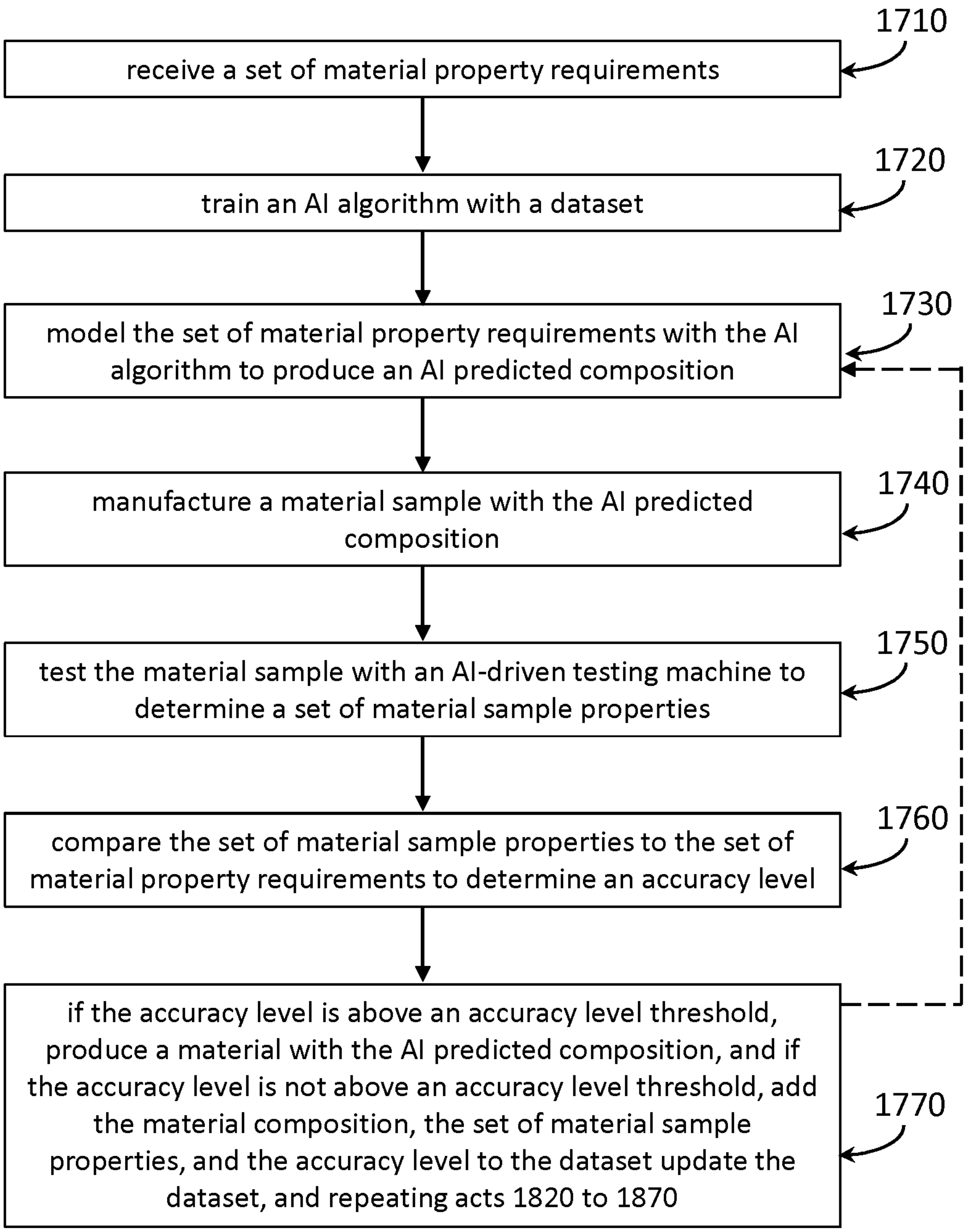
FIG. 17 is a flowchart outlining a method for producing a material with AI predicted composition.

FIG. 17 is a flowchart outlining a method for producing a material with AI predicted composition.

Initially, a set of material property requirements is received (1710). Non-exclusive examples of material property requirements include hardness, toughness, Young's modulus, storage modulus, loss modulus, abrasion resistance, maximum strain at break, strain at onset of plastic deformation, and creep rate. The material property requirements may be seen as a set of values to be met by the material produced by method 1700.

An AI algorithm is then trained with a dataset (1720). The dataset may include test data from material samples with properties similar to the set of material property requirements. The AI algorithm may be a linear iteration algorithm. Training the AI algorithm may include comparing material sample compositions with the resulting material sample properties to correlate material sample compositions with material sample properties.

The set of material property requirements is then modelled by the AI algorithm to produce an AI predicted composition (1730). The AI predicted composition may include chemical compositions (polymer chain length and distribution for polymeric samples, filler type and volume fraction, crosslink presence and density, plasticizer type and volume fraction), and processing conditions (maximum temperature, heating and cooling rate, pressure). The AI predicted composition may be a composition with a highest probability of meeting or exceeding the set of material property requirements as identified by the AI algorithm.

A material sample with the AI predicted composition is then manufactured (1740). Manufacturing a material sample enables testing of the material sample. The material sample is then tested with an AI driven testing machine to determine a set of material sample properties (1750). The material sample properties determined by the AI driven testing machine may be the same properties as the set of material property requirements.

The set of material sample properties is compared to the set of material property requirements to determine an accuracy level (1760). The accuracy level may be a percentage of a critical material property, for example the material sample hardness divided by the required material hardness×100%. The accuracy level may be a weighted average of the percentage of multiple material properties. The accuracy level may be a binary (yes/no) value, where a yes corresponds to all material sample properties meeting or exceeding the material property requirements and a no corresponds to at least one material sample property failing to meet or exceed the material property requirements.

If the accuracy level is above an accuracy level threshold, a material with the AI predicted composition is produced. For example, an accuracy level threshold may be 100% for a critical material property, 100% for a weighted average of multiple material properties, or no for a binary accuracy level (where yes is above the threshold). If the accuracy level is not above an accuracy level threshold, the material composition, the set of material sample properties, and the accuracy level is added to the dataset to update the dataset portions of the method. The method may be repeated until a material sample is produced with an accuracy level above an accuracy level threshold. Parts of the method may be repeated until the accuracy level is not significantly higher than the accuracy level of the previously produced sample, where significantly higher may be 1% higher, 0.1% higher, or less than 0.1% higher.

The AI model, such as a multiple linear iteration method, may predict a material composition to achieve material properties such as strength or hardness. Upon creating a material with the predicted composition, automated testing may be carried out using testing machine 100 and data obtained by the automated testing may then be fed back into the AI model to refine the model and increase the accuracy of the AI model. In one embodiment, a sample is received by the system. The sample is then placed into the gripping apparatus (such as the AI grips). The composition of the sample is then determined, for example by comparing the characteristics of the sample with records stored in a database. These characteristics can be obtained via sensors within the system that sense characteristics. Non-exclusive examples of characteristic include hardness, thickness, width, surface finish and surface friction. The grip strength of the AI grips may then be adjusted in response to the determination of the composition of the sample.

In one embodiment, the present disclosure describes AI grips that are self-learning. Therefore, as more tests are carried out on samples of varying properties, the grip characteristics may be updated to correspond to the material being tested. This may, over time, reduce the likelihood of a sample slip occurring during sample testing and thereby improve the effectiveness of sample gripping. The AI learning component may improve the ability of the automated AI driven testing machine to test a broad variety of samples and materials with improved grip strength accuracy.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. An automated artificial intelligence (AI) driven testing machine for testing at least one material sample comprising:

a loading station for receiving the at least one material sample;

a testing station to test a testing property of the at least one material sample;

a pick-and-place (PP) apparatus to transfer the at least one material sample between the loading station and the testing station;

a database for storing material sample characteristics; and a control system to control the testing station and the PP apparatus and to collect data associated with the testing station and to process a measurement property of the at least one material sample to generate testing parameters for the testing station by comparing the measurement property with the material sample characteristics;

wherein the testing parameters are associated with AI grip characteristics for self-learning AI grips.

2. The AI driven testing machine of claim 1 further comprising at least one measurement station for measuring the measurement property of the at least one material sample.

3. The AI driven testing machine of claim 1 wherein the loading station comprises:

a loading tray or a magazine loading system.

4. The AI driven testing machine of claim 1 wherein the testing station comprises a pair of AI grips.

5. The AI driven testing machine of claim 4 wherein the pair of AI grips comprises:

a stationary AI grip; and a mobile AI grip.

6. The AI driven testing machine of claim 5 wherein the mobile AI grip moves with respect to the stationary AI grip to test the at least one material sample.

7. The AI driven testing machine of claim 6 wherein a strain and stress of the at least one material sample is tested.

8. The AI driven testing machine of claim 5 wherein the pair of AI grips further comprises a set of sensors.

9. The AI driven testing machine of claim 8 wherein the set of sensors sense slip.

10. The AI driven testing machine of claim 4 wherein each of the pair of AI grips comprises an actuator for enabling the AI grip to grip the at least one material sample.

11. The AI driven testing machine of claim 10 wherein the actuator is a stepper motor.

12. The AI testing machine of claim 1 wherein the AI grip characteristics comprise grip strength or grip force.

13. A method of automated testing of at least one material sample comprising:

receiving the at least one material sample;

determining testing parameters for the at least one material sample by comparing a measurement property of the at least one material sample with material sample characteristics stored in a database; and testing the at least one material sample with the determined testing parameters;

wherein the testing parameters are associated with grip characteristics of a set of self-learning artificial intelligence (AI) grips.

14. The method of claim 13 wherein determining testing parameters comprises:

determining at least one measurement property of the at least one material sample; and processing the at least one measurement property to determine the testing parameters.

15. The method of claim 14 wherein the testing parameters comprise grip strength or grip force.

16. The method of claim 13 testing the at least one material sample comprises:

performing a tensile test on the at least one material sample.

17. The method of claim 16 further comprising:

measuring a stress force applied to the at least one material sample.

18. The method of claim 16 further comprising:

measuring a strain force applied to the at least one material sample.

* * * * *